(12) United States Patent
Lyon et al.

(10) Patent No.: US 8,699,873 B2
(45) Date of Patent: Apr. 15, 2014

(54) IDENTIFYING FAULT LOCATIONS IN A NETWORK

(75) Inventors: Daniel Paul Lyon, Richardson, TX (US); Catherine Haiyan Yuan, Plano, TX (US); Sanjay Gera, Richardson, TX (US); Vikas Mittal, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 404 days.

(21) Appl. No.: 12/779,601

(22) Filed: May 13, 2010

(65) Prior Publication Data

US 2011/0280567 A1    Nov. 17, 2011

(51) Int. Cl.
*H04B 10/00* (2013.01)
*H04J 1/16* (2006.01)

(52) U.S. Cl.
USPC .................................. 398/10; 398/1; 370/216

(58) Field of Classification Search
USPC ....................................................... 398/10, 17
See application file for complete search history.

(56) References Cited

U.S. PATENT DOCUMENTS

| | | | | |
|---|---|---|---|---|
| 5,717,796 A * | 2/1998 | Clendening | ...................... | 385/24 |
| 6,963,995 B2 * | 11/2005 | Fee | ............... | 714/4.12 |
| 7,046,619 B2 * | 5/2006 | Alagar et al. | ................. | 370/216 |
| 7,113,698 B1 * | 9/2006 | Ryhorchuk et al. | ............ | 398/10 |
| 7,113,699 B1 * | 9/2006 | Bhate et al. | ....................... | 398/15 |
| 7,349,479 B2 * | 3/2008 | Suganuma et al. | ........... | 375/257 |
| 7,474,850 B2 * | 1/2009 | Sadananda et al. | ............... | 398/2 |
| 7,499,646 B2 * | 3/2009 | Emongkonchai | ................ | 398/2 |
| 7,710,864 B2 * | 5/2010 | Binetti et al. | ................ | 370/218 |
| 7,831,144 B2 * | 11/2010 | Emongkonchai | ................ | 398/2 |
| 8,280,244 B2 * | 10/2012 | Sugawara | ......................... | 398/4 |
| 2003/0039208 A1 * | 2/2003 | Soumiya | ........................ | 370/216 |
| 2003/0137932 A1 * | 7/2003 | Nishioka et al. | ............... | 370/216 |
| 2004/0255184 A1 * | 12/2004 | Bejerano et al. | .................. | 714/4 |
| 2005/0185954 A1 * | 8/2005 | Sadananda et al. | ............... | 398/5 |
| 2006/0077609 A1 * | 4/2006 | Bender et al. | ................. | 361/93.1 |
| 2008/0124074 A1 * | 5/2008 | Yang et al. | ....................... | 398/10 |
| 2008/0259784 A1 * | 10/2008 | Allan et al. | .................... | 370/216 |
| 2009/0175166 A1 * | 7/2009 | Long et al. | ..................... | 370/225 |
| 2012/0147742 A1 * | 6/2012 | Kitamori et al. | ............. | 370/225 |
| 2013/0083647 A1 * | 4/2013 | Xie | ............................... | 370/216 |

OTHER PUBLICATIONS

Aiglent technologie et al; An overview of ITU-T G.079; Sep. 2001; pp. 1-12.*
"An Overview of ITU-T B.709," Agilent Technologies, © Agilent Technologies, U.K. Ltd. 2001, 12 pages.
Gendron, Robert et al., "The G.709 Optical Transport Network—An Overview," EXFO, © 2006 EXFO Electo-Opitcal Engineering, Inc., 7 pages.
Schubert, Andreas, "G.709—The Optical Transport Network (OTN)," White Paper, © 2007 JDS Uniphase Corporation, 14 pages.

* cited by examiner

*Primary Examiner* — Ken Vanderpuye
*Assistant Examiner* — Amritbir Sandhu
(74) *Attorney, Agent, or Firm* — Baker Botts L.L.P.

(57) ABSTRACT

Systems and methods for identifying a fault location in an optical network are disclosed. In accordance with one embodiment of the present disclosure, a method for identifying a fault location in an optical network comprises monitoring, by a network element, an eastward optical path and a westward optical path for faults. The method further comprises transmitting, by the network element, a first data packet along the eastward path and a second data packet along the westward path. The first and second data packets comprise an eastward fault indicator and a westward fault indicator comprising information associated with any eastward or westward faults occurring on the eastward or westward paths. The fault indicators indicate the existence of an eastward or westward fault and the network element that detected the fault.

14 Claims, 7 Drawing Sheets

IDENTIFYING FAULT LOCATIONS IN A NETWORK

TECHNICAL FIELD

The present invention relates generally to the field of communication systems and more specifically to identifying the location of faults in an optical network.

BACKGROUND OF THE INVENTION

Communication networks are typically configured to detect faults within the networks. Faults may disrupt the traffic transported along the communication networks and cause a loss of communication between nodes in the networks. Communication networks seek to isolate the faults in a timely manner to avoid losses of data and to maintain communication within the network.

SUMMARY OF THE INVENTION

In accordance with the present disclosure, disadvantages and problems associated with previous techniques for identifying a fault location in an optical network may be reduced or eliminated.

In accordance with one embodiment of the present disclosure, a method for identifying a fault location in an optical network comprises monitoring, by a network element, an eastward optical path for faults and monitoring, by the network element, a westward optical path for faults.

The method further comprises transmitting, by the network element, a first data packet along the eastward path. The first data packet comprises a first eastward fault indicator comprising information associated with any eastward faults occurring on the eastward path. The first eastward fault indicator indicates the existence of an eastward fault and the network element that detected the eastward fault. The first data packet also comprises a first westward fault indicator comprising information associated with any westward faults occurring on the westward path. The first westward fault indicator indicates the existence of a westward fault and the network element that detected the westward fault.

The method further comprises transmitting, by the network element, a second data packet along the westward path. The second data packet comprising a second eastward fault indicator comprising information associated with any eastward faults occurring on the eastward path. The second eastward fault indicator indicates the existence of an eastward fault and the network element that detected the eastward fault. The second data packet further comprises a second westward fault indicator comprising information associated with any westward faults occurring on the westward path. The second westward fault indicator indicates the existence of a westward fault and the network element that detected the westward fault.

In accordance with another embodiment of the present disclosure a network element comprises a controller configured to monitor an eastward optical path for faults and monitor a westward optical path for faults. The controller further configured to generate a first data packet and a second data packet.

The first data packet comprises a first eastward fault indicator comprising information associated with any eastward faults occurring on the eastward path. The first eastward fault indicator indicates the existence of an eastward fault and the network element that detected the eastward fault. The first data packet further comprises a first westward fault indicator comprising information associated with any westward faults occurring on the westward path. The first westward fault indicator indicates the existence of a westward fault and the network element that detected the westward fault.

The second data packet comprises a second eastward fault indicator comprising information associated with any eastward faults occurring on the eastward path. The second eastward fault indicator indicates the existence of an eastward fault and the network element that detected the eastward fault. The second data packet further comprises a second westward fault indicator comprising information associated with any westward faults occurring on the westward path. The second westward fault indicator indicates the existence of a westward fault and the network element that detected the westward fault.

The network element further comprises one or more interfaces communicatively coupled to the controller. The one or more interfaces are configured to transmit the first data packet along the eastward optical path and transmit the second data packet along the westward optical path as directed by the controller.

BRIEF DESCRIPTION OF THE DRAWINGS

For a more complete understanding of the present disclosure, and the advantages thereof, reference is now made to the following written description taken in conjunction with the accompanying drawings, in which.

DETAILED DESCRIPTION OF THE INVENTION

Embodiments of the present disclosure and its advantages are best understood by referring to FIGS. 1-6, where like numbers are used to indicate like and corresponding parts.

Figure 1:
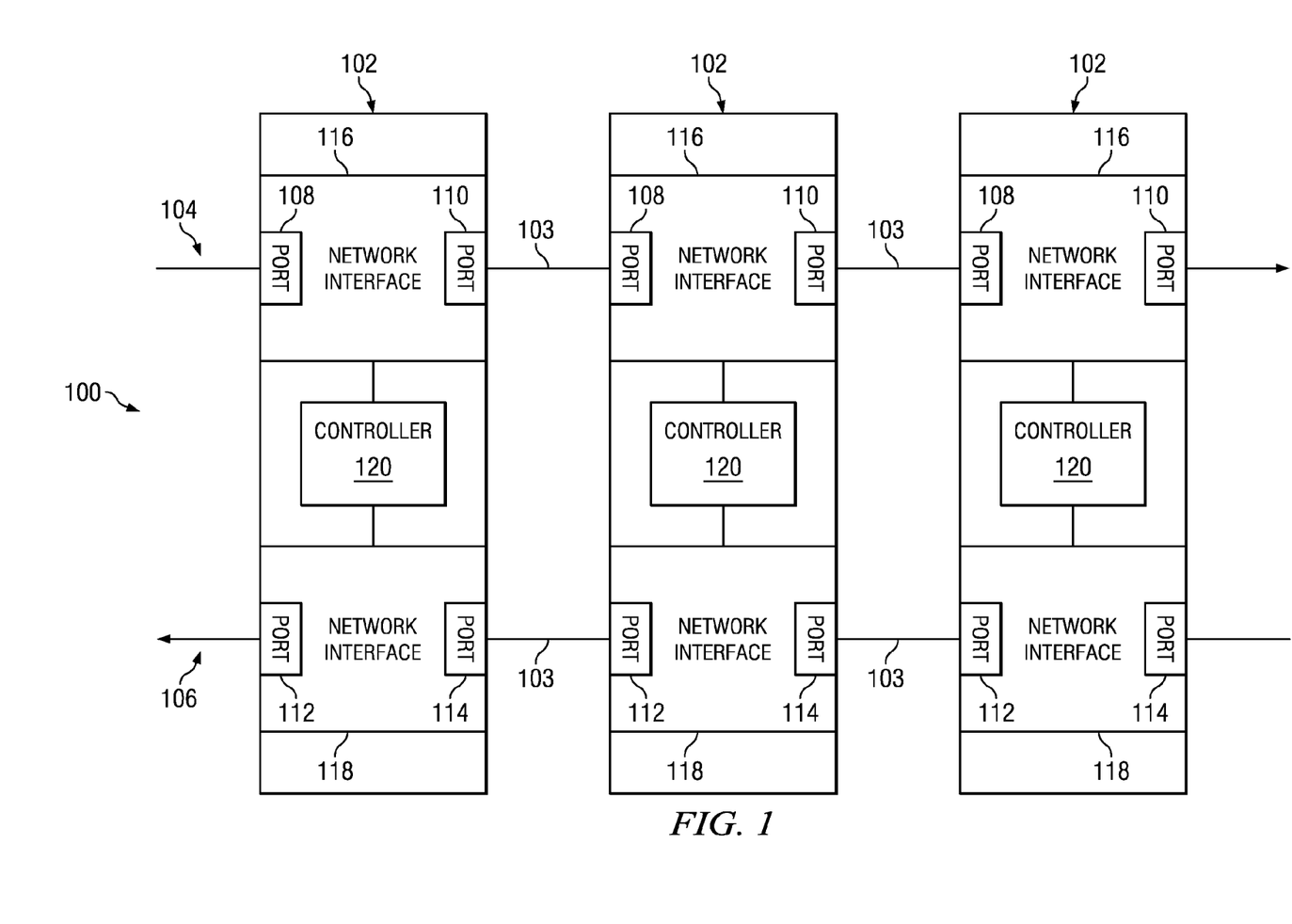
FIG. 1 illustrates an example system configured to transmit data within a network.

FIG. 1 illustrates an embodiment of a system 100 configured to transmit data or signals within a network. A communication network may include nodes and transmission media that facilitate communication between nodes within the network. The communication of signals or data between and within nodes may be referred to as "traffic."

In some embodiments the nodes may be network elements 102 that receive or transmit traffic within the network. Transmission media 103 may be configured to couple network elements 102 and carry traffic between network elements 102.

Faults or errors may occur in transmission media 103 or network elements 102 and the faults may disrupt traffic within the network. Network elements 102 may be configured to detect and report faults to allow isolation and correction of the faults and maintain communication throughout the network.

In certain embodiments, the network may be a communication network. A communication network allows nodes (e.g., network elements 102) to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the proceeding.

In some embodiments, system 100 may comprise an Optical Transport Network (OTN). Traffic may be transmitted by network elements 102 within an OTN according to various protocols such as ITU G.709. Network elements 102 may transmit traffic in data packets or frames known as Optical Transport Unit (OTU) frames.

Traffic may be information transmitted, stored, or sorted within the communication network. Such traffic may comprise optical or electrical signals configured to encode audio, video, textual, or any other suitable data. The data may also be real-time or non-real-time. Traffic may be communicated via any suitable communications protocol, including, without limitation, the Open Systems Interconnection (OSI) standard and Internet Protocol (IP). Additionally, traffic may be structured in any appropriate manner including, but not limited to, being structured in frames, packets, or an unstructured bit stream.

A transmission medium 103 may include any system, device or apparatus configured to couple corresponding ports of nodes (e.g., network elements 102) to each other and transmit traffic between the corresponding ports. For example, a transmission medium 103 may include an optical fiber, a T1 cable, a WiFi signal, a Bluetooth signal, or any other suitable medium.

A link may describe the communicative connection between two adjacent network elements 102. A link may be a physical or logical connection between adjacent nodes. A physical link may include the corresponding ports 108-114 and transmission media 103 that couple adjacent network elements 102 to each other.

In some embodiments, traffic may travel from one network element 102 (a source network element 102) to another network element 102 (a destination network element 102) along an eastward path 104 or a westward path 106. Eastward path 104 and westward path 106 may include the source network element 102, one or more transmission media 103, zero, one, or more intermediate network elements 102 and the destination network element 102.

Although eastward path 104 and westward path 106 are labeled as such, the labels do not mean that the paths are actually travelling east and west. The labels are merely to indicate that traffic on eastward path 104 is being sent in an opposite direction of traffic being sent on westward path 106.

Network elements 102 may be configured to monitor eastward path 104, westward path 106 or both eastward path 104 and westward path 106 for faults or errors. Network elements 102 may be further configured to detect a fault on eastward path 104, westward path 106 or both eastward path 104 and westward path 106. Network elements 102 may be further configured to identify and transmit the location of a fault by identifying network element 102 that detected the fault and the port associated with the network element 102 that detected the fault and associated with the link where the fault may have occurred.

A network element 102 may be any system, apparatus or device that may be configured to route traffic through, to, or from a network. Examples of network elements 102 include routers, switches, reconfigurable optical add-drop multiplexers (ROADMs), wavelength division multiplexers (WDMs), access gateways, intra-connected switch pair, endpoints, softswitch servers, trunk gateways, or a network management system.

Network elements 102 may include various components including, but not limited to, interfaces 116 and 118, ports 108-114, controller 120, logic, memory or other suitable element.

Interfaces 116 and 118 may include any system, apparatus or device configured to receive input, send output, process the input or output, or perform other suitable operations. Interfaces 116 and 118 may comprise hardware, software or a combination of both. In some embodiments interfaces 116 and 118 may comprise a peripheral interface unit (PIU). Further, although network elements 102 are depicted with two interfaces, network elements 102 may include any number of network interfaces.

Ports 108-114 may include any system, device or apparatus configured to serve as an interface between a corresponding transmission medium and network interfaces 116 and 118. Ports 108-114 may also include the hardware, software or a combination of both configured to facilitate the flow of traffic through ports 108-114 and the transmission medium. Ports 108-114 may comprise physical or logical interfaces. In some embodiments, ports 108-114 may include, but are not limited to an Ethernet port, a USB port, a Firewire port, a WiFi transmitter/receiver, a Bluetooth transmitter/receiver or an OTN port. Although network elements 102 are depicted with four ports, network elements 102 may include any number of ports. Further, although ports 110 and 114, and ports 108 and 112 are depicted as being separate ports, in some embodiments ports 110 and 114 may be a single, bi-directional port, and ports 108 and 112 may be another single, bi-directional port.

Controller 120 may include any system, device or apparatus communicatively coupled to network element 102 and the components within network element 102. Controller 120 may also be configured to control the operations of network element 102. For example, controller 120 may be communicatively coupled to interfaces 116 and 118, or ports 108-114, or both interfaces 116 and 118, and ports 108-114. Controller 120 may to direct the routing of input signals to their appropriate output destination through interfaces 116 and 118 and ports 108-114.

Further, controller 120 may monitor paths and detect faults within the network. Controller 120 may also be configured to generate data packets that identify the location of the faults. Controller 120 may further be configured to direct interfaces 116 and 118 to transmit the data packets to other network elements 102 via ports 108-114, and thus, report the faults to other network elements 102 or a system administrator.

Although network elements 102 are depicted with one controller 120, the disclosure should not be limited to such. Network elements 102 may include multiple controllers 120 that may perform various operations. For example, network interfaces 116 and 118, and ports 108-114 may include controllers 120 that may perform the operations of these components.

Logic within components of network elements 102 may perform the operations of the components within network elements 102. For example, logic may execute instructions to route input signals to their appropriate output destination. Logic may include hardware, software, other logic or any combination thereof. Logic may be encoded in one or more tangible media and may perform operations when executed by a computer. Certain logic, such as a processor, may manage the operation of a component. Examples of a processor include one or more computers, one or more microprocessors, one or more applications, or other logic.

In particular embodiments, components of network elements 102 may include computer readable media encoded with a computer program, software, computer executable instructions, or instructions capable of being executed by a computer. The computer readable media may perform the operations of the network elements 102 or components within network elements 102. In other embodiments, computer readable media storing a computer program, embodied with a computer program, encoded with a computer program, having a stored computer program or having an encoded computer program may perform the operations of the embodiments.

Components of network elements 102 may also include memory that may comprise one or more tangible, computer-readable, or computer executable storage medium that stores information. Examples of memory include computer memory (e.g., Random Access Memory (RAM), Read Only Memory (ROM)), mass storage media (e.g., a hard disk), removable storage media (e.g., a Compact Disk (CD), a Digital Video Disk (DVD), or a flash memory drive), database or network storage (e.g., a server), or other computer-readable medium.

Modifications, additions, or omissions may be made to system 100 without departing from the scope of the disclosure. For example, although three network elements 102 are depicted, system 100 may include more or fewer than three network elements 102. Further, more or fewer paths may be included in network 100 than eastward and westward paths 104 and 106.

Figure 2:
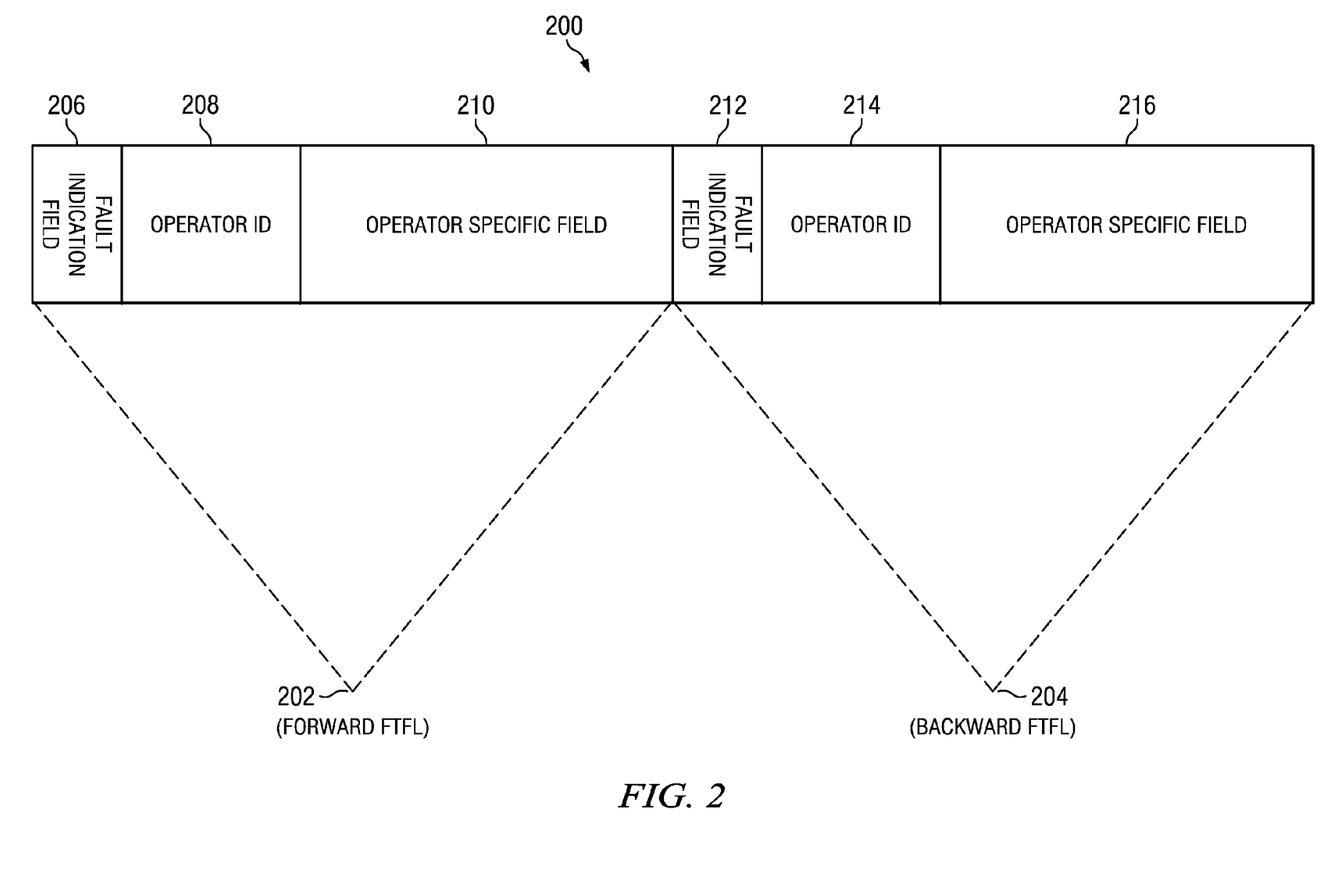
FIG. 2 illustrates a portion of an Optical Data Unit header in an Optical Transport Unit (OTU) frame that may include information that identifies a fault location in a network.

FIG. 2 illustrates a portion of an OTU frame that may include information that identifies a fault location in a network. In the present embodiment, the OTU frame may include an Optical Data Unit (ODU) having a Fault Type Fault Location (FTFL) field 200. FTFL field 200 may include a forward FTFL field 202 and a backward FTFL field 204. FTFL field 200 may comprise two hundred fifty-six bytes for carrying information. Forward FTFL field 202 may comprise one hundred twenty-eight bytes and backward FTFL field 204 may also include one hundred twenty-eight bytes. FTFL field 200 may include information related to faults that may occur along paths within a network (e.g., eastward path 104 and westward path 106).

Forward FTFL field 202 may provide the ability to send forward path fault indicators throughout network 100. Backward FTFL field 204 may provide the ability to send backward path fault indicators throughout network 100.

Forward FTFL field 202 may include information associated with faults occurring along the path that the OTU frame is travelling on. Backward FTFL field 204 may include information associated with faults occurring along the path that is opposite to the path that the OTU frame is travelling on.

For example, an FTFL field 200 of an OTU frame travelling along eastward path 104 may include a forward FTFL field 202 that includes fault information associated with eastward path 104. The FTFL field 200 of the OTU frame travelling along eastward path 104 may also include a backward FTFL field 204 that includes fault information associated with westward path 106.

Alternatively, an FTFL field 200 of an OTU frame travelling along westward path 106 may include a forward FTFL field 202 that includes fault information associated with westward path 106. The FTFL field 200 of the OTU frame travelling along westward path 106 may also include a backward FTFL field 204 that includes fault information associated with eastward path 104.

Forward FTFL field 202 and backward FTFL field 204 may include fault indication fields 206 and 212, operator ID fields 208 and 214, and operator specific fields 210 and 216. Fault indication fields 206 and 212 may include fault indication codes that indicate whether a fault has occurred and the type of fault that may occur along the paths within a network. Fault indication codes may include codes found in ITU G.709 such as "signal fail," "signal degrade," and "no fault."

Fault indication fields 206 and 212 may be one byte long and fault indication field 206 may be the first byte of forward FTFL field 202 (byte 0 of FTFL field 200). Fault indication field 212 may be the first byte of backward FTFL field 204 (byte 128 of FTFL field 200).

Forward FTFL field 202 and backward FTFL field 204 may also include operator identification (ID) fields 208 and 214. Operator ID fields 208 and 214 may identify the network operator associated with the network where a fault may have occurred or been detected. Operator ID fields 208 and 214 may include further sub-fields including an international segment field and a national segment field. The international segment field may include a country code (e.g., a three character International Organization for Standardization (ISO) 3166 geographic/political country code (G/PCC)) that identifies the country of the network operator. The national segment field may include an identifier of the network carrier or operator based on a standardization such as an International Telecommunications Union (ITU) carrier code (ICC).

Operator ID fields 208 and 214 comprise nine bytes after the bytes for fault indication fields 206 and 212 (e.g. bytes 1-9 of FTFL field 200 for operator ID field 208 and bytes 129-137 for operator ID field 214.

Forward FTFL field 202 and backward FTFL field 204 may also include operator specific fields 210 and 216. In the present embodiment, operator specific fields 210 and 216 may include additional information related to the location of an error in a network. In one embodiment, operator specific fields 210 and 216 may include information indicating the network element 102 that may have detected the fault. The network element 102 that detected the fault may be identified using a node Target Identifier ("<TID>") or any other suitable identifier.

Operator specific fields 210 and 216 may further include information indicating a port 108-114 associated with the link where a fault may occur. Ports 108-114 may be identified using a port access identifier ("<ODU AID>").

Therefore, in some embodiments, operator specific fields 210 and 216 may pinpoint the location of a fault by including network element and port identifiers (e.g., <TID> and <ODU AID>) within operator specific fields 210 and 216. By pinpointing the location of faults, the faults may be isolated quickly and disruption of traffic within a network may be reduced or eliminated.

In some embodiments, the network element that detects a fault may automatically include <TID> and <ODU AID> information in an FTFL field or other suitable data packet. In other embodiments, the operator of a network may determine how to identify the location of a fault in another manner and may insert that identification in operator specific fields 210 and 216, or any other suitable data packet.

Modifications, additions, or omissions may be made to data packet 200 without departing from the scope of the disclosure. For example, operator specific fields 212 and 216 may include more or less information that may pinpoint the location of a fault occurring along a path. Additionally, although FTFL field 200 and its sub-fields are specifically noted as including information indicating the location and type of a fault, any other suitable data packet may also be used.

Figure 3:
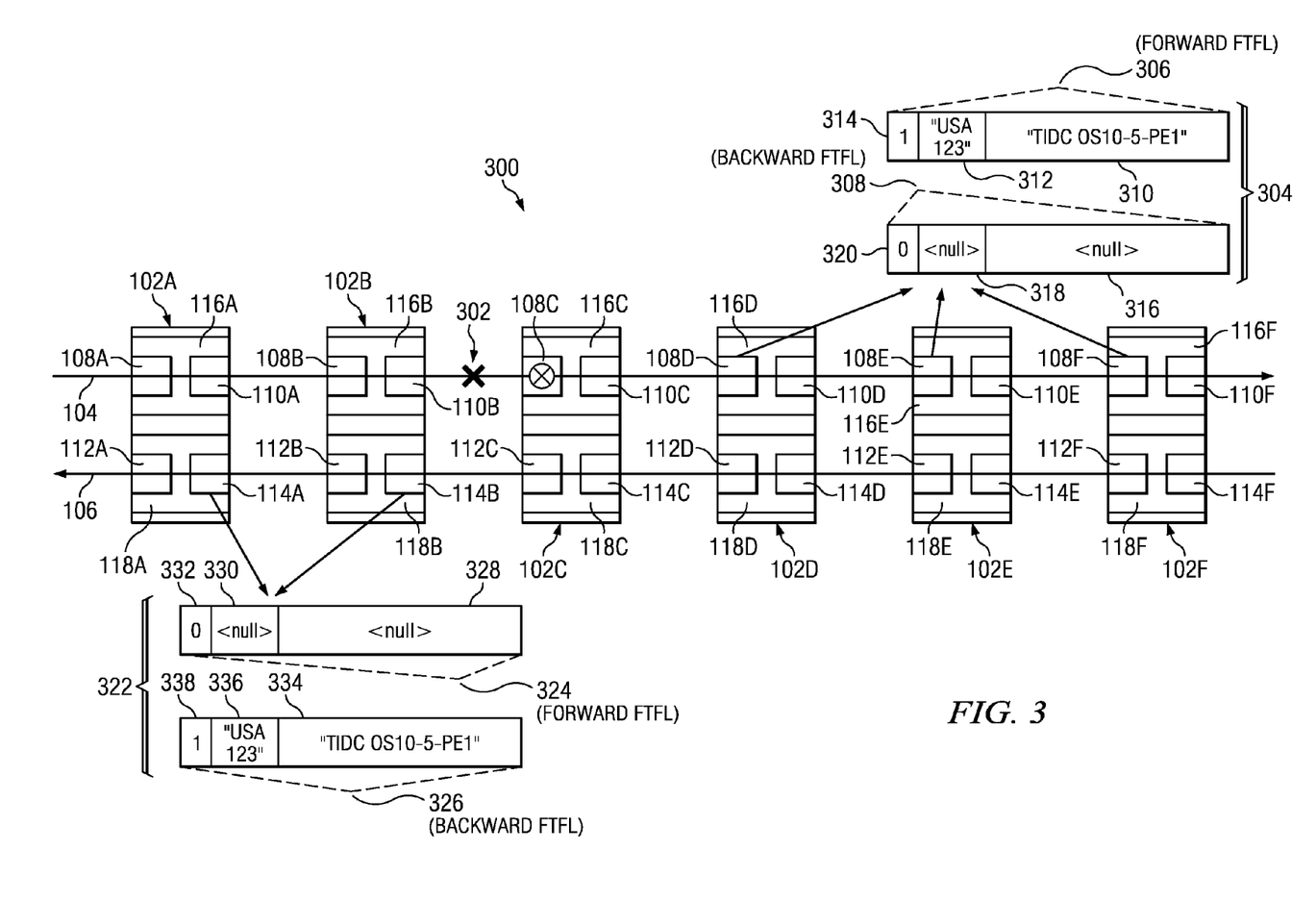
FIG. 3 illustrates an example system that may be used to identify a fault location within a network.

FIG. 3 illustrates an example system 300 that may be used to identify a fault location within a network. System 300 may include network elements 102A-102F similar to network elements 102 depicted in FIG. 1. System 300 may also include eastward path 104 and westward path 106. A fault 302 may occur between network elements 102B and 102C on eastward path 104. Fault 302 may occur due to a problem with a transmission medium or port associated with the link between network elements 102B and 102C. After detecting fault 302, network element 102C may transmit a data packet along eastward path 104 to network element 102D to notify other network elements 102 along eastward path 104 of fault information. In the present embodiment, the data packet may comprise an OTU frame that includes an FTFL field 304 similar to FTFL field 200 depicted in FIG. 2. FTFL field 304 may include a forward FTFL field 306 that includes information associated with faults occurring on eastward path 104. FTFL field 304 may also include a backward FTFL field 308 that includes information associated with faults occurring on westward path 106.

As previously noted, the forward FTFL field may indicate fault information relating to the path that the OTU frame containing the FTFL field is travelling along. The backward FTFL field may indicate fault information relating to the path opposite to the path that the OTU frame containing the FTFL field is travelling along. In the present embodiment the OTU frame containing FTFL field 304 is travelling along eastward path 104, therefore forward FTFL field 306 may include fault information relating to eastward path 104. Backward FTFL field 308 may include fault information relating to westward path 106 because traffic on westward path 106 may travel in the opposite direction of the OTU frame containing FTFL field 304—which may be travelling on eastward path 104.

Forward FTFL field 306 may include a fault identification field 314 that may identify the type of fault 302 that occurred on eastward path 104 (e.g., "signal fail," "signal degrade," etc.). Forward FTFL field 306 may further include an operator ID field 312 that identifies the network operator of the network depicted by system 300. Operator ID field 312 may include an international segment identifying the operator's country, and an ICC that identifies the network operator. In the present embodiment, the network operator may be located in the United States and the ICC for the operator may be "123," therefore, the operator ID field may be "USA123."

Forward FTFL field 306 may further include an operator specific field 310 that indicates the network element and port associated with fault 302. In the present embodiment, operator specific field 310 may identify network element 102C as the network element that detected fault 302. Operator specific field 310 may further indicate that port 108C within network element 102C is associated with fault 302. Port 108C is associated with the link between network elements 102B and 102C where fault 302 occurred and, thus, port 108C may also be associated with fault 302. Therefore, operator specific field 310 may pinpoint the location of fault 302 on eastward path 104 within network 300.

In the present embodiment operator specific field 310 may identify network element 102C using a <TID> <ODU AID> identifier where the <TID> identifier may identify network element 102C and the <ODU AID> identifier may identify port 108C. For example, the <TID> <ODU AID> identifier for network element 102C and port 108C may be "TIDC OS10-5-PE1."

Backward FTFL field 308 may also include a fault identification field 320, an operator ID field 318, and an operator specific field 316 to provide information associated with any faults occurring on westward path 106. In the present example, no faults have occurred on westward path 106, and therefore fields 320, 318 and 316 may be set to "0" or "<null>" to indicate such.

As network element 102D receives FTFL field 304 from network element 102C, network element 102D may send an OTU frame containing FTFL field 304 along eastward path 104 to network element 102E, which may forward FTFL field 304 to network element 102F etc. By receiving FTFL field 304, which includes information indicating that network element 102C and port 108C are associated with fault 302, each network element 102 following network element 102C on eastward path 104 may more specifically know the location of fault 302 on eastward path 104.

Additionally, network element 102C may transmit a data packet, along westward path 106 to network element 102B to notify other network elements 102 along westward path 106 of any fault information. In the present embodiment, the data packet may comprise an OTU frame that includes an FTFL field 322. FTFL field 322 may include a forward FTFL field 324 that includes information associated with faults occurring on westward path 106. FTFL field 322 may also include a backward FTFL field 326 that includes information associated with faults occurring on eastward path 104.

Forward FTFL field 324 may include fault information related to westward path 106 because the OTU frame containing FTFL field 322 may travel along westward path 106. Backward FTFL field 326 may include fault information related to eastward path 104 because the OTU frame containing FTFL field 322 may travel in a direction opposite of eastward path 104—along westward path 106.

Forward FTFL field 324 may also include a fault identification field 332, an operator ID field 330, and an operator specific field 328 to provide information associated with any faults occurring on westward path 106. In the present example, no faults have occurred on westward path 106, and therefore fields 332, 330, and 328 may be set to "0" or "<null>" to indicate such.

Backward FTFL field 326 may include a fault identification field 338 that may identify the type of fault 302 that occurred on eastward path 104 (e.g., "signal fail," "signal degrade," etc.). Backward FTFL field 326 may further include an operator ID field 336 that includes similar or identical information to that included in operator ID field 312 of forward FTFL field 306 in FTFL field 304.

Backward FTFL field 326 may further include an operator specific field 334 that indicates the network element and port associated with fault 302. In the present embodiment, operator specific field 334 may include similar or identical information to that included in operator specific field 310 of forward FTFL field 306 in FTFL field 304.

As network element 102B receives the OTU frame containing FTFL field 322, network element 102B may send an OTU frame containing FTFL field 322 along westward path 106 to network element 102A, which may send an OTU frame containing FTFL field 322 along westward path 106 to other network elements 102. By receiving an OTU frame containing FTFL field 322, which may include information indicating that network element 102C and port 108C are associated with fault 302, each network element 102 following network element 102C on westward path 106 may more specifically know the location of fault 302 on eastward path 104.

Modifications, additions, or omissions may be made to system 300 without departing from the scope of the disclosure. For example, system 300 may include more than the six network elements 102 depicted or system 300 may include fewer than the six network elements depicted. Further, system 300 may include more or fewer paths than eastward path 104 and westward path 106.

Figure 4:
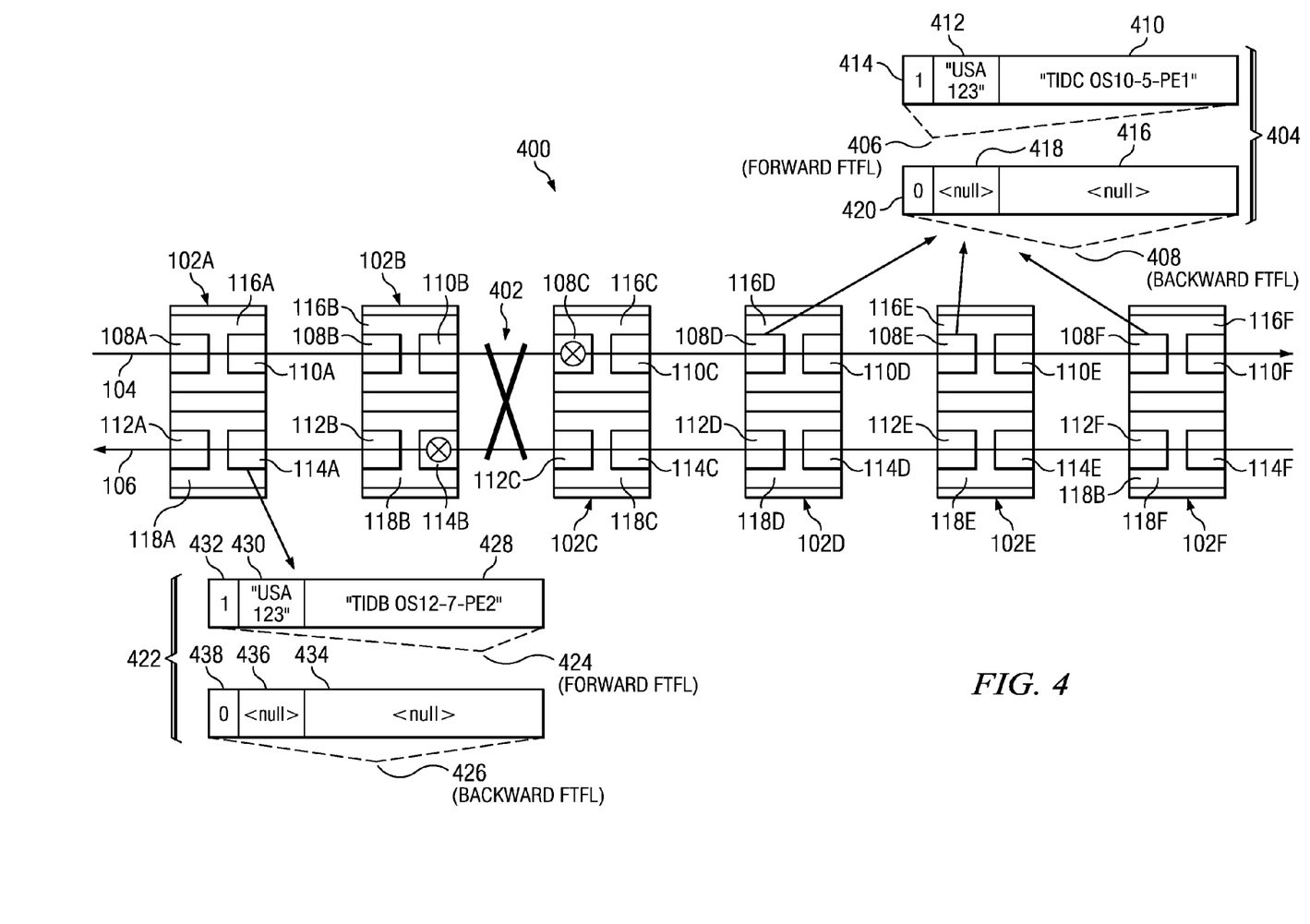
FIG. 4 illustrates another example system that may be used to identify a fault location within a network.

FIG. 4 illustrates another example system that may be used to identify a fault location within a network.

System 400 may include network elements 102A-102F similar to network elements 102A-102F as depicted in FIG. 3. System 400 may also include eastward path 104 and westward path 106. Instead of occurring on just one path like fault 302 in FIG. 3, a fault 402 may occur at the links between network elements 102B and 102C on both eastward path 104 and westward path 106. Network element 102C may detect fault 402 on eastward path 104 and network element 102B may detect fault 402 on westward path 106.

Because fault 402 on eastward path 104 may be similar to fault 302 depicted in FIG. 3, Network element 102C may transmit a data packet, such as an OTU frame that includes an FTFL field 404 identical or similar to FTFL field 304 described with respect to FIG. 3.

FTFL field 404 may include a forward FTFL field 406 that includes similar or identical information as forward FTFL field 306 depicted in FIG. 3. FTFL field 404 may also include a backward FTFL field 408 that includes similar or identical information as backward FTFL field 308 depicted in FIG. 3.

Network elements 102D-102F may also send OTU frames along eastward path 104 to notify other network elements of the occurrence and location of fault 402 on eastward path 104.

Additionally, network element 102C may attempt to transmit a data packet, such as an OTU frame that includes an FTFL field, along westward path 106 to network element 102B, similar to FTFL field 322 described in FIG. 3. However, in the present example, the data packet may not reach network element 102B from network element 102C along westward path 106 because fault 402 may affect the transmission of traffic along westward path 106 between network elements 102B and 102C.

But, network element 102B may transmit a data packet, such as an OTU frame, along westward path 106 to network element 102A indicating that network element 102B has detected fault 402 at the link between network elements 102B and 102C on westward path 106. In the present embodiment, the data packet may comprise an OTU frame that includes an FTFL field 422. FTFL field 422 may include a forward FTFL field 424 that includes information associated with faults occurring on westward path 106. FTFL field 422 may also include a backward FTFL field 426 that includes information associated with faults occurring on eastward path 104.

Forward FTFL field 424 may include a fault identification field 432 that may identify the type of fault 402 that occurred on westward path 106. (e.g., "signal fail," "signal degrade," etc.).

Forward FTFL field 424 may further include an operator ID field 430 that indicates the network operator of the network depicted by system 400. As in FIG. 3, the network operator may be located in the United States and the ICC for the operator may be "123," therefore, the operator ID field may be "USA123."

Forward FTFL field 424 may further include an operator specific field 428 that indicates the network element and port associated with fault 402. In the present embodiment, operator specific field 428 may identify network element 102B as the network element that detected fault 402 on westward path 106. Operator specific field 428 may further indicate that port 114B within network element 102B is associated with fault 402. In the present embodiment operator specific field 428 may identify network element 102B and port 114B using a <TID> <ODU AID> identifier where the <TID> identifier may identify network element 102B and the <ODU AID> identifier may identify port 114B. For example, the <TID> <ODU AID> identifier for network element 102B and port 114B may be "TIDB OS12-7-PE2."

Backward FTFL field 426 may also include a fault identification field 438, an operator ID field 436, and an operator specific field 434 to provide information associated with any faults occurring on westward path 106. In the present example, network element 102B has not detected that any faults have occurred on eastward path 104. Network element 102B may not receive—due to fault 402—information from network element 102C along westward path 106 indicating that fault 402 also occurred on eastward path 104 between network elements 102B and 102C. Therefore, network element 102B may set fields 438, 436 and 434 to "0" or "<null>" to indicate that network element 102B has not detected an error on eastward path 104 and that network element 102B has not received information indicating that an error has occurred on westward path 106.

Network element 102A may receive the OTU frame containing FTFL field 422 and also transmit an OTU frame containing FTFL field 422 along westward path 106 to notify other network elements 102 along westward path 106 of the occurrence and location of fault 402 on westward path 106.

Additionally, network element 102B may attempt to transmit a data packet, such as an OTU frame, along eastward path 104 to network element 102C. However, in the present example, the data packet may not reach network element 102C from network element 102B along eastward path 104 because fault 402 may affect the transmission of traffic between network elements 102B and 102C along eastward path 104.

Modifications, additions, or omissions may be made to system 400 without departing from the scope of the disclosure. For example, system 400 may include more than the six network elements 102 depicted or system 400 may include fewer than the six network elements depicted. Further, system 400 may include more paths than eastward path 104 and westward path 106.

Figure 5:
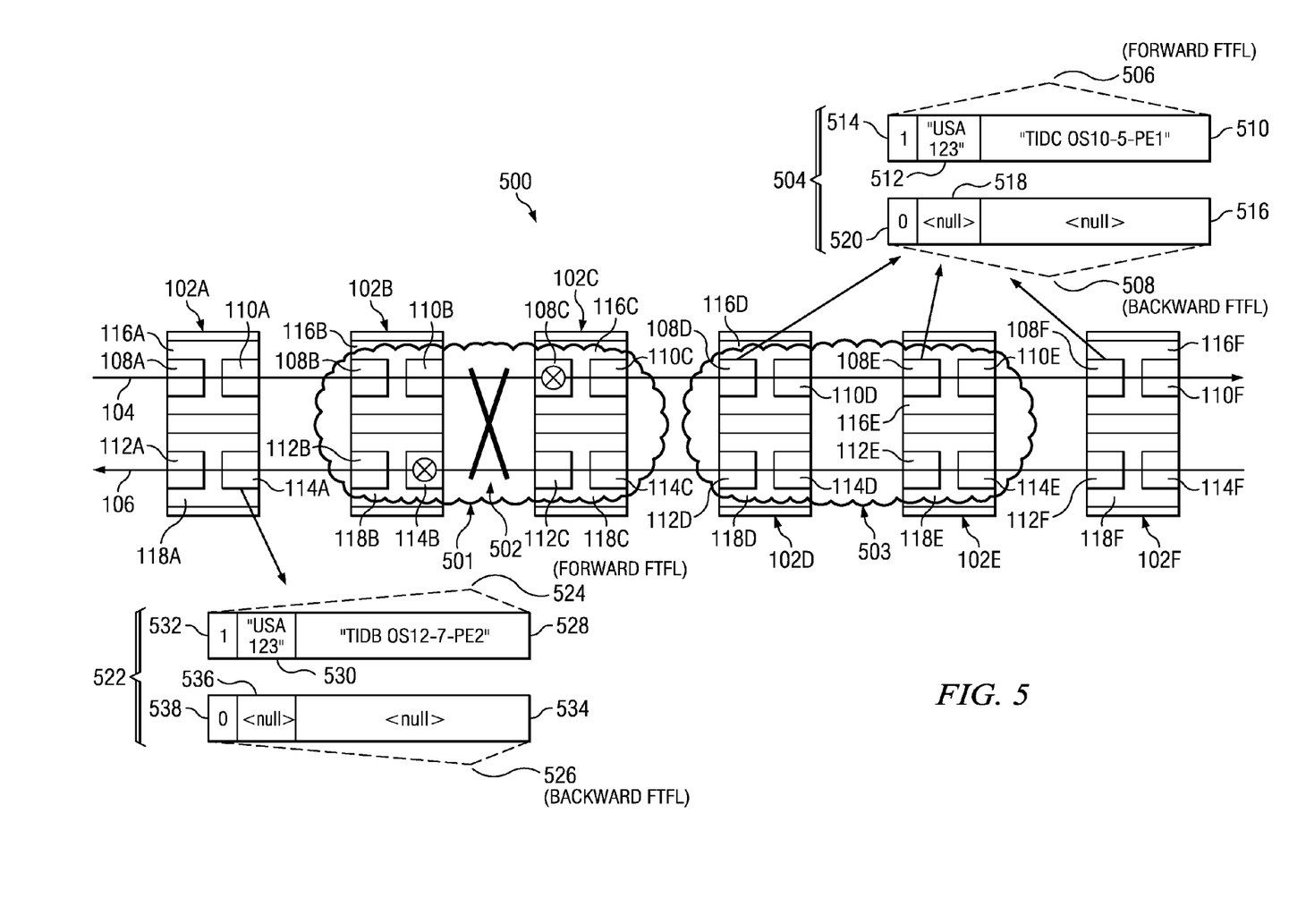
FIG. 5 illustrates another example system that may be used to identify a fault location within a network spanning across multiple operators.

FIG. 5 illustrates another example system that may be used to identify a fault location within a network.

System 500 may include network elements 102A-102F similar to network elements 102A-102F depicted in FIGS. 3 and 4. System 500 may also include eastward path 104 and westward path 106. Unlike systems 300 and 400 depicted in FIGS. 3 and 4, system 500 may also include a sub-network 501 managed by a system operator and a sub-network 503 managed by another system operator.

A fault 502, similar to fault 402 depicted in FIG. 4, may occur between network elements 102B and 102C on eastward path 104 and westward path 106 in sub-network 501. Network element 102C may detect fault 502 on eastward path 104 and network element 102B may detect fault 502 on westward path 106.

Network element 102C may send a data packet, such as an OTU frame that includes an FTFL field 504 similar or identical to FTFL field 404 depicted in FIG. 4, along eastward path 104. FTFL field 504 may include a forward FTFL field 506 that includes similar or identical information as forward FTFL fields 306 and 406 depicted in FIGS. 3 and 4. FTFL field 504 may also include a backward FTFL field 508 that includes similar or identical information as backward FTFL fields 308 and 408 depicted in FIGS. 3 and 4.

Network element 102B may also send a data packet, such as an OTU frame that includes an FTFL field 522 similar or identical to FTFL field 422 depicted in FIG. 4, along westward path 106. FTFL field 522 may include a forward FTFL field 524 that includes similar or identical sub-fields and information as forward FTFL field 424 depicted in FIG. 4. FTFL field 522 may also include a backward FTFL field 526 that includes similar or identical sub-fields and information as backward FTFL field 426 depicted in FIG. 4.

However, unlike in systems 300 and 400 depicted in FIGS. 3 and 4, system 500 explicitly includes two sub-networks—sub-network 501 and sub-network 503. Sub-network 501 may be managed in the United States by a network operator with an ICC of "123," and the operator ID for sub-network 501 may be "USA123" like the operators in the embodiments in FIGS. 3 and 4. Sub-network 503 may also be managed in the United States but by a different network operator with an ICC of "456," and the operator ID for sub-network 503 may be "USA456."

Fault 502 may occur in sub-network 501, and the operator ID field 512—included in forward FTFL field 506 contained in an OTU frame sent along eastward path 104—may comprise the operator ID "USA123," indicating that fault 502 occurred in sub-network 501. Accordingly, the operator ID field 530—included in forward FTFL field 524 contained in an OTU frame sent along westward path 106—may also comprise the operator ID "USA123." If fault 502 were to occur in sub-network 503 instead of sub-network 501, operator ID fields 512 and 530 may comprise an operator ID of "USA456" instead of "USA123."

When network elements 102D and 102E receive the OTU frame that includes FTFL field 504 and an operator ID field 512 with an operator ID of "USA123," network elements 102D and 102E may know that fault 502 occurred in sub-network 501 and not sub-network 503 or any other sub-networks that may be included in system 500. Also, when network element 102A receives the OTU frame that includes FTFL field 522 and an operator ID field 530 with an operator ID of "USA123," network element 102A may know that fault 502 occurred in sub-network 501, and not sub-network 503 or any other sub-networks that may be included in system 500.

Modifications, additions, or omissions may be made to system 500 without departing from the scope of the disclosure. For example, system 500 may include more than the six network elements 102 depicted or system 500 may include fewer than the six network elements depicted. Further, system 500 may include more or fewer paths than eastward path 104 and westward path 106. Additionally, system 500 may include fewer or more sub-networks than the two sub-networks explicitly mentioned.

Figure 6A:
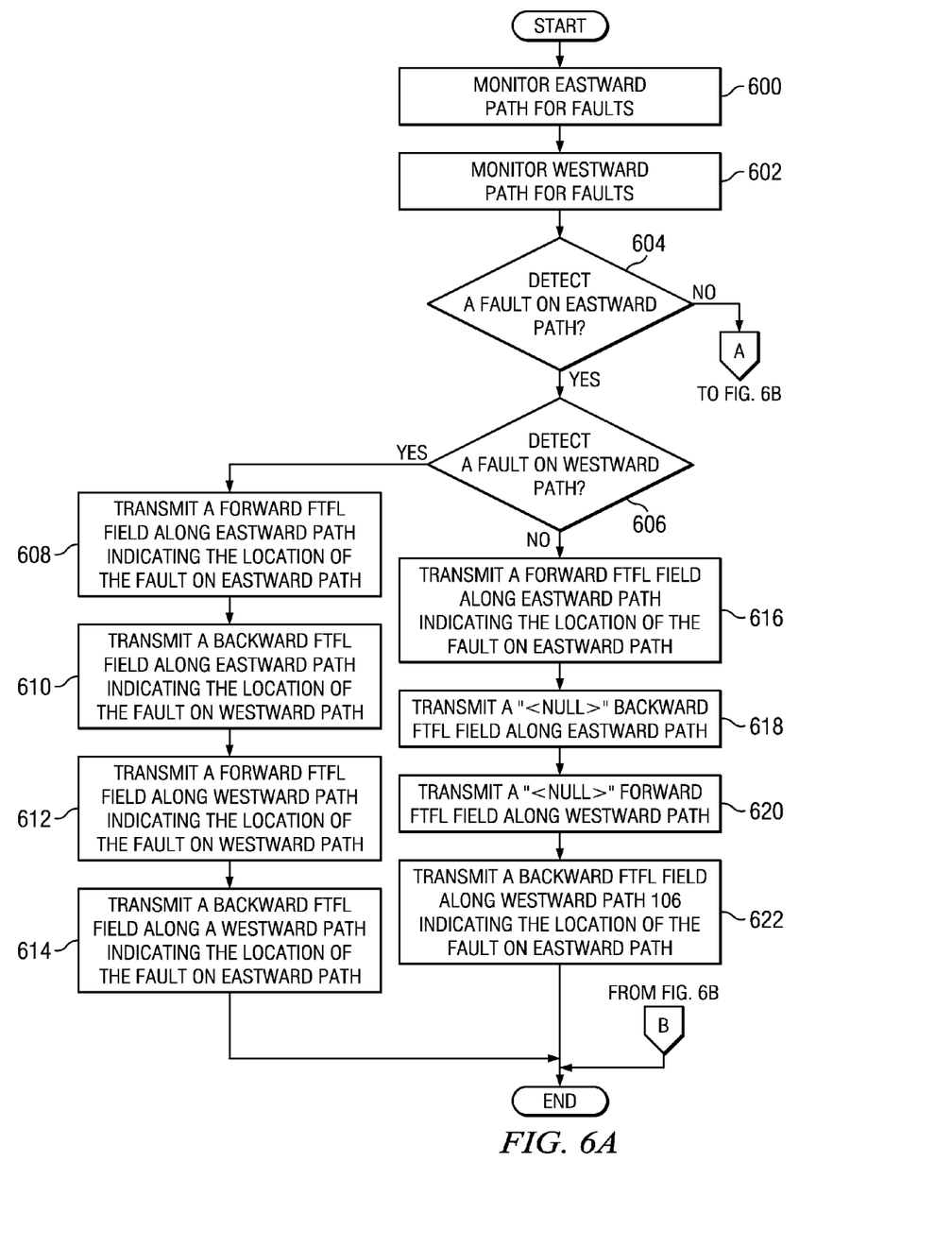
FIGS. 6A and 6B illustrate an example of a method for identifying a fault location in a network.
Figure 6B:
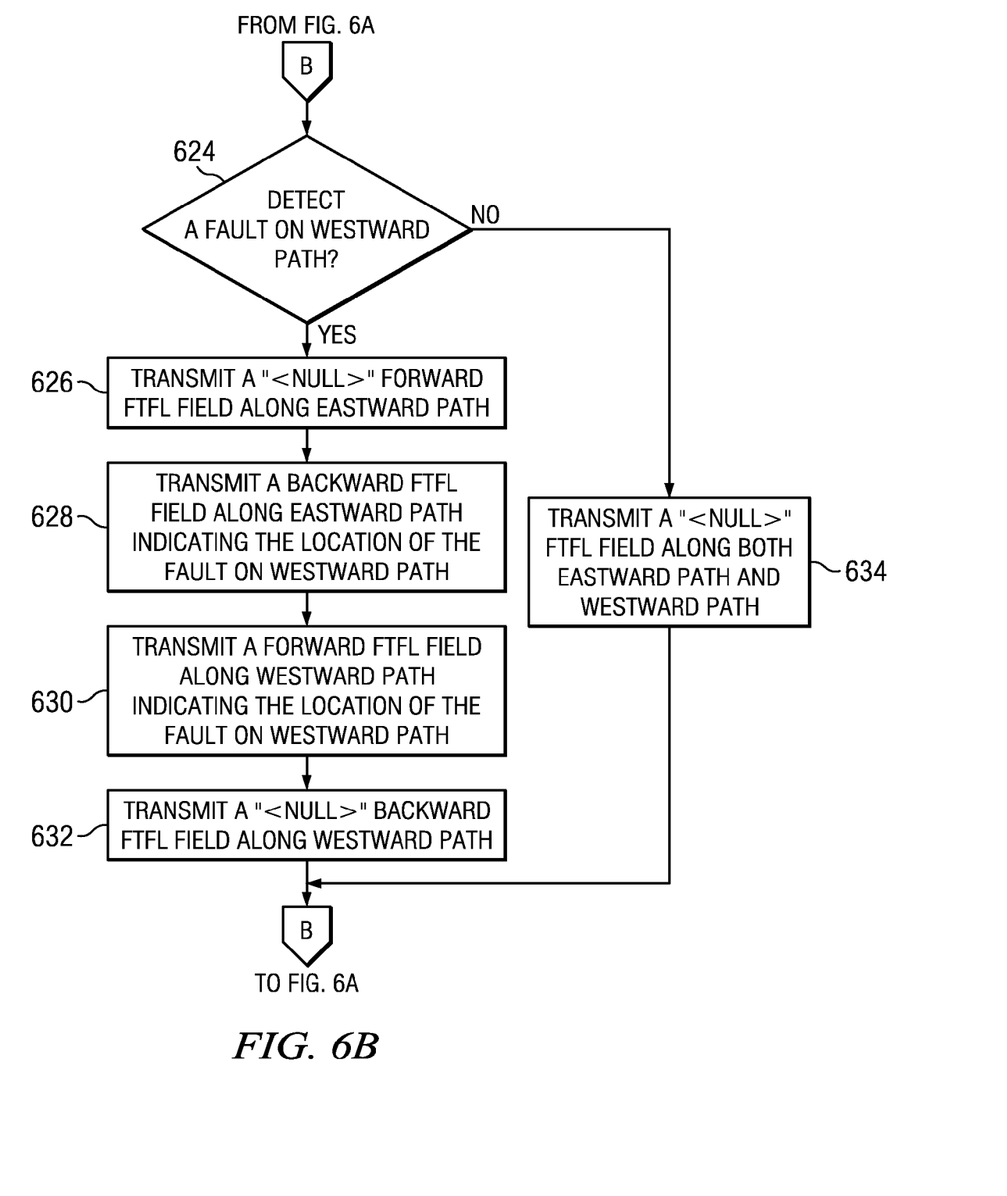

FIGS. 6A and 6B illustrate an example of a method for identifying a fault location in a network or system such as that depicted in FIG. 1.

At step 600, in FIG. 6A, a network element 102, may monitor eastward path 104 for faults. Network element 102 may also monitor westward path 106 for faults at step 602. Network element 102 may determine whether it detected a fault on eastward path 104 at step 604. If network element 102 detects a fault at step 604, network element 102 may then determine if it has detected a fault on westward path 106 at step 606. In another embodiment, network element 102 may perform steps 600 and 602 simultaneously. Network element 102 may also perform steps 604 and 606 simultaneously in other embodiments.

If network element 102 has detected a fault on westward path 106 at step 606, at step 608, network element 102 may transmit a forward FTFL field along eastward path 104. The forward FTFL field may indicate that network element 102 detected a fault on eastward path 104. The forward FTFL field may indicate the type and location of the fault detected on eastward path 104. The location information may include the network operator ID of the network where the fault occurred. The location information may also include the "<TID>" of the network element that detected the fault and may further include the port "<ODU><AID>" of the port associated with the link where the fault on the eastward path occurred.

Network element 102 may also transmit a backward FTFL field along eastward path 104 at step 610. The backward FTFL field may indicate that network element 102 also detected a fault on westward path 106 in addition to the fault detected on eastward path 104.

The backward FTFL field sent in step 610 may indicate the type and location of the fault detected on westward path 106. The backward FTFL field may include information for the fault detected on westward path 106 similar to the information included in the forward FTFL field described in step 608.

At step 612, network element 102 may transmit another forward FTFL field, but along westward path 106 instead of along eastward path 104. The forward FTFL field transmitted along westward path 106 may indicate the type and location of the fault detected on westward path 106. In some embodiments, the information included in the forward FTFL field transmitted along westward path 106 in step 612 may be identical or similar to the information included in the backward FTFL field transmitted along eastward path 104 in step 610.

At step 614, network element 102 may transmit another backward FTFL field, but along westward path 106 instead of along eastward path 104. The backward FTFL field transmitted along westward path 106 may indicate the type and location of the fault detected on eastward path 104. In some embodiments, the information included in the backward FTFL field transmitted along westward path 106 in step 614 may be identical or similar to the information included in the forward FTFL field transmitted along eastward path 104 in step 608. Following step 614, the method may end.

If network element 102 does not detect a fault on westward path 106 at step 606, the method may move to step 616 instead of step 608. At step 616, network element 102 may transmit a forward FTFL field along eastward path 104 indicating the type and location of the fault detected on eastward path 104. The forward FTFL field transmitted in step 616 may be similar or identical to the forward FTFL field transmitted in step 608.

However, at step 618, network element 102 may transmit a backward FTFL field along eastward path 104 with the fault indication field, the operator ID field and the operator-specific field may each have a "0" or "<null>" inserted. The "0" or "<null>" may indicate to the network elements further along eastward path 104 that network element 102 has not detected an error on westward path 106.

Following step 618, network element 102 may also transmit a forward FTFL field along westward path 106, with the fault indication field, the operator ID field and the operator specific field may also each have a "0" or "<null>" inserted. The "0" or "<null>" may also indicate to the other network elements further along westward path 106 that network element 102 has not detected an error on westward path 106.

At step 622, network element 102 may transmit a backward FTFL field along westward path 106 indicating the type and location of the fault on eastward path 106, thus informing other network elements further along westward path 106 of the fault on eastward path 104. Following step 622, the method may end.

Returning to step 604, if network element 102 does not detect a fault on eastward path 104 at step 604, network element 102 may determine if it has detected a fault on westward path 106 at step 624, in FIG. 6B. If network element 102 has detected a fault at step 624 the method may move to step 626 where the network element may transmit a "<null>" or "0" forward FTFL field along eastward path 104 indicating that it has not detected any errors on eastward path 104.

Network element 102 may transmit a backward FTFL field along eastward path 104 at step 628. The backward FTFL field may include information indicating the type and location of the fault detected on westward path 106. Network element 102 may also transmit a forward FTFL field along westward path 106 at step 630 that may also indicate the type and location of the fault detected on westward path 106. Therefore, through steps 628 and 630, network element 102 may notify the other network elements along eastward path 104 and westward path 106 of the type and location of the fault detected on westward path 106.

At step 632, network element 102 may transmit a "<null>" or "0" backward FTFL along westward path 106 to notify the other network elements further along westward path 106 that network element 102 has not detected a fault on eastward path 104. Following step 632 the method may also end.

Returning now to step 624, if network element 102 does not detect a fault at step 624, the method may move to step 634. If the method moves to step 634, network element 102 has not detected a fault on either eastward path 104 or westward path 106. Therefore, at step 634 network element 102 may transmit "<null>" or "0" forward and backward FTFL fields along both eastward path 104 and westward path 106, indicating that network element 102 has not detected any faults in either path. Following step 634 the method may also end.

Modifications, additions, or omissions may be made to the method without departing from the scope of the disclosure. For example, the method may include more steps than those depicted or it may include fewer steps than those depicted. Further, although the information transmitted has been depicted as FTFL fields, any other suitable data packet may be used to transmit fault location information.

Although the present disclosure and its advantages have been described in detail, it should be understood that various changes, substitutions and alternations can be made herein without departing from the spirit and scope of the disclosure as defined by the following claims.

What is claimed is:

1. A method for identifying a fault location in an optical network comprising:
   monitoring, by a network element, an eastward optical path for faults;
   monitoring, by the network element, a westward optical path for faults;
   detecting, by the network element, an eastward fault on the eastward path and no fault on the westward path;
   transmitting, by the network element, a first data packet along the eastward path, the first data packet comprising:
      a first eastward fault indicator indicating the existence of the eastward fault and the network element that detected the eastward fault; and
      a first westward fault indicator comprising information associated with any westward faults occurring on the westward path, the first westward fault indicator including a null field indicating the absence of a westward fault; and
   the method further comprising transmitting, by the network element, a second data packet along the westward path, the second data packet comprising:
      a second eastward fault indicator indicating the existence of the eastward fault and the network element that detected the eastward fault; and
      a second westward fault indicator comprising information associated with any westward faults occurring on the westward path, the second westward fault including a null field indicating the absence of a westward fault.

2. The method of claim 1, wherein the fault indicators further indicate a port associated with the faults.

3. The method of claim 1, wherein the first data packet and the second data packet comprise an Optical Data Unit (ODU) of an Optical Transport Unit (OTU) frame.

4. The method of claim 1, wherein the first eastward fault indicator and the second westward fault indicator comprise a Forward Fault Type Fault Location (Forward FTFL) associated with an Optical Data Unit (ODU).

5. The method of claim 1, wherein the first westward fault indicator and the second eastward fault indicator comprise a Backward Fault Type Fault Location (Backward FTFL) associated with an Optical Data Unit (ODU).

6. The method of claim 1, wherein the fault indicators comprise a Target Identifier (TID) associated with the network element that identified the faults.

7. The method of claim 2, wherein the fault indicators comprise an Access Identifier (AID) of the port.

8. A network element comprising:
   a controller configured to:
      monitor an eastward optical path for faults;
      monitor a westward optical path for faults;
      detect an eastward fault on the eastward path and no fault on the westward path; and
      generate a first data packet and a second data packet, the first data packet comprising:
         a first eastward fault indicator indicating the existence of the eastward fault and the network element that detected the eastward fault; and
         a first westward fault indicator comprising information associated with any westward faults occurring on the westward path, the first westward fault indicator including a null field indicating the absence of a westward fault;
      the second data packet comprising:
         a second eastward fault indicator indicating the existence of the eastward fault and the network element that detected the eastward fault; and
         a second westward fault indicator comprising information associated with any westward faults occurring on the westward path, the second westward fault including a null field indicating the absence of a westward fault;
   the network element further comprising one or more interfaces communicatively coupled to the controller and configured to transmit the first data packet along the eastward optical path and transmit the second data packet along the westward optical path as directed by the controller.

9. The network element of claim 8, wherein the fault indicators further indicate a port associated with the faults.

10. The network element of claim 8, wherein the first data packet and the second data packet comprise an Optical Data Unit (ODU) of an Optical Transport Unit (OTU) frame.

11. The network element of claim 8, wherein the first eastward fault indicator and the second westward fault indicator comprise a Forward Fault Type Fault Location (Forward FTFL) associated with an Optical Data Unit (ODU).

12. The network element of claim 8, wherein the first westward fault indicator and the second eastward fault indicator comprise a Backward Fault Type Fault Location (Backward FTFL) associated with an Optical Data Unit (ODU).

13. The network element of claim 8, wherein the fault indicators comprise a Target Identifier (TID) associated with the network element that identified the faults.

14. The network element of claim 9, wherein the fault indicators comprise an Access Identifier (AID) of the port.

* * * * *